United States Patent [19]

Self

[11] 3,954,124
[45] May 4, 1976

[54] HIGH ENERGY LOSS NESTED SLEEVE FLUID CONTROL DEVICE

[76] Inventor: Richard E. Self, 3221 Brimhall Drive, Los Alamitos, Calif. 90720

[22] Filed: Dec. 5, 1973

[21] Appl. No.: 421,972

[52] U.S. Cl. .................................. 138/42; 138/40; 138/43; 137/625.3; 137/625.37; 251/127
[51] Int. Cl.² ...................... F15D 1/00; F16K 47/00; F16K 47/08
[58] Field of Search ........................ 138/40, 42, 43; 137/625.3, 625.37; 251/127

[56] References Cited
UNITED STATES PATENTS

| | | | |
|---|---|---|---|
| 3,323,550 | 6/1967 | Lee | 138/43 X |
| 3,688,800 | 9/1972 | Hayner | 138/42 |
| 3,722,854 | 3/1973 | Parola | 138/42 X |
| 3,780,767 | 12/1973 | Borg | 138/42 X |

FOREIGN PATENTS OR APPLICATIONS

| | | | |
|---|---|---|---|
| 94,230 | 8/1973 | Italy | 138/42 |

Primary Examiner—Richard E. Aegerter
Assistant Examiner—James E. Bryant, III
Attorney, Agent, or Firm—Hill, Gross, Simpson, Van Santen, Steadman, Chiara & Simpson

[57] ABSTRACT

Nested concentric sleeves or tubes subdivide flow of fluids through a fluid control valve into a myriad of streams between the valve inlet and outlet which flow through passages that create a high energy loss and pressure drop on the fluid to release the fluid at low pressures without generating noise, permitting cavitation or eroding equipment through which the fluid flows.

19 Claims, 6 Drawing Figures

HIGH ENERGY LOSS NESTED SLEEVE FLUID CONTROL DEVICE

BACKGROUND OF THE INVENTION

1. Field of the Invention

This invention relates to the art of relieving pressures from high pressure fluids at high speeds without noise generation, cavitation, or erosion of the equipment housing the fluids.

2. Prior Art

In my prior U.S. Pat. Nos. 3,451,404 issued June 24, 1969; 3,513,864 issued May 26, 1970; and 3,514,074 issued May 26, 1970, the disclosures of which are incorporated herein by reference, there are described and claimed high energy loss fluid control devices especially useful in fluid transfer systems where a potentially destructive or noise generating fluid pressure differential exists to release the pressure without generating noise and without cavitation, erosion, and the like destructive characteristics. In these patents high pressure fluid is subdivided into a plurality of streams flowing through passageways having a long length to diameter ratio imparting high frictional resistance losses to the fluid flow. In U.S. Pat. Nos. 3,513,864 and 3,514,074 these passageways are provided by stacked annular disks having grooves and apertures defining tortuous passageways for the streams of fluid. The fluid flows radially from the outer to the inner periphery of the stacked disks or from the inner to the outer peripheries of the stack and a plug slidable in the central bore or aperture of the stack covers and uncovers the passageways so as to regulate flow through the device. Since the fluid pressures in the passageways tend to separate the disks, the stack must be axially loaded to resist separation of the disks accommodating leakage between the passageways.

SUMMARY OF THIS INVENTION

The present invention now replaces the stack of disks with nested concentric tubular sleeves or tubes which need not be axially loaded to prevent leakage between passageways. According to this invention concentric tubular sleeves or tubes of progressively decreasing diameter sized as to tightly telescope one within the other, are circumferentially grooved along the length thereof, thus providing a stack of annular passageways along the length of the sleeves.

The tubular sleeves have orifices communicating with each passageway but the orifices are offset so that fluid flowing radially through the nested sleeves will have a tortuous path as it advances from one annular passageway to the next. The orifices of one sleeve are thus circumferentially displaced from the orifice in the next sleeve and the fluid flows through a myriad of orifices in the inner and outer peripheries of the telescoped sleeves which subdivide the fluid into streams and as the streams of fluid from the inlet orifices flow into the annular passages, each will impact against the next adjacent sleeve and turn to flow circumferentially in the passageway until it reaches adjacent downstream orifices whereupon it will again turn to enter the next annular passageway.

Since the passageways have a larger volume than the orifices feeding these passageways the fluid can expand in the passageways but not enough to permit flashing of the fluid.

The successive orifices and passageways through which the fluid must pass to traverse the radial width of the nested sleeves provides an elongated tortuous path which will impart frictional resistance to flow. This is aided by impinging adjacent streams against each other in the annular passageways.

The fluid can flow either radially inward or radially outward through the nested sleeves and pressure of the fluid will either expand or contract the sleeves, depending upon the direction of flow but, in either direction, the pressure of the fluid urges the sleeves into tight fitting sealed relation to prevent leakage between the annular passageways. Thus, flow from the outer to the inner periphery of the nested sleeves will successively contract the outer sleeves on the inner sleeves into tightly sealed engagement therewith while the reverse flow will successively expand the inner sleeves against the surrounding sleeves to develop the sealing pressure preventing leakage between the sleeves.

It is then an object of this invention to provide high energy loss control devices of the types described in my aforesaid U.S. Pat. Nos. 3,451,404; 3,513,864; and 3,514,074 with nested or telescoped sleeves or tubes providing the passageways which impart frictional resistance to flow of fluids for decreasing the fluid pressure without noise and destructive forces.

A further object of the invention is to provide a high energy loss fluid control device with nested orificed and circumferentially grooved tubes having flow passages imparting high frictional resistance losses to fluid flow therethrough.

A specific object of the inventioon is to provide a high energy loss plug valve with concentric nested sleeves surrounding the plug which have successive radial orifices and circumferential passageways effective to impart high frictional resistance losses to radial fluid flow through the sleeves.

Another specific object of the invention is to provide a concentric sleeve valve which will dissipate energy of fluid flowing therethrough and control velocity of the fluid by radial orifices and circumferential passages defined by the concentric sleeves.

Still another specific object of this invention is to provide a high energy loss control device with a cage composed of telescoped concentric sleeves having orifices and annular passageways dissipating energy of fluid passed therethrough without noise generation or destructive forces.

Other and further objects of this invention will be apparent to those skilled in this art from the following detailed description of the annexed sheets of drawings which by way of examples, illustrate several embodiments of the invention.

ON THE DRAWINGS

AS SHOWN ON THE DRAWINGS

Figure 1:
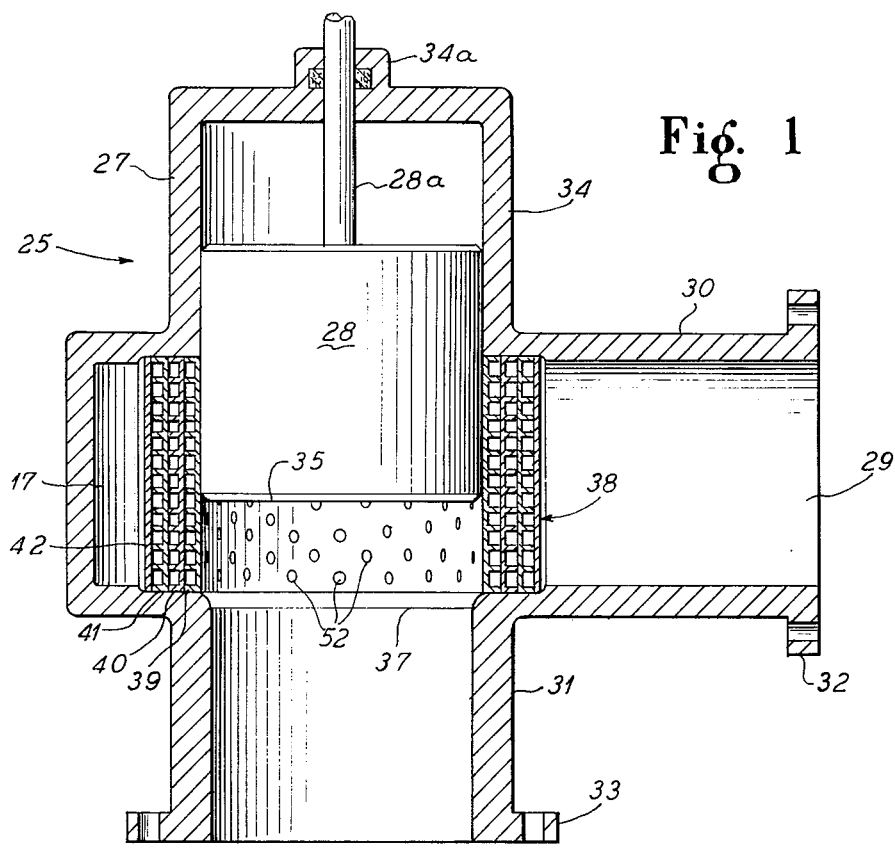
FIG. 1 is a longitudinal sectional view through a nested sleeve valve of this invention.

In FIG. 1, a control valve assembly 25 includes a valve housing 27 within which a valve plug 28 is mounted in controlling relation to a passage 29 which extends through angularly related portions 30 and 31 having respective flanges 32 and 33 at their open ends by which the housing is adapted to be secured in fluid tight communication with other members serving as continuations of the passage 29 in a fluid flow system. To control the passage 29, the valve plug 28 is reciprocably mounted in the housing section 31 which has a head extension 34 within which the plug is slidably received in the fully open condition of the valve and from which the plug projects into throttling relation across the passage 29 to effect incremental closing between a fully open and a fully closed position wherein an annular valve shoulder 35 seats on a complementary valve seat 37 joining the junction of the body sections 30 and 31 and about which is provided an encompassing chamber 17. Reciprocal movements of the valve plug 28 are adapted to be effected through a valve stem 28a extending through a packing gland 34a in the head end of the chamber 34.

To attain energy losses in the flowing medium in the passage 29 in either selected direction without damaging velocities and abrupt pressure drop all fluid passing the plug 28 is subdivided into a plurality of streams having elongated tortuous paths imposing frictional resistance energy loss on the flowing fluid medium. These streams are created by a cage 38 of nested or telescoped concentric cylindrical sleeves or tubes surrounding the plug 28.

Figure 2:
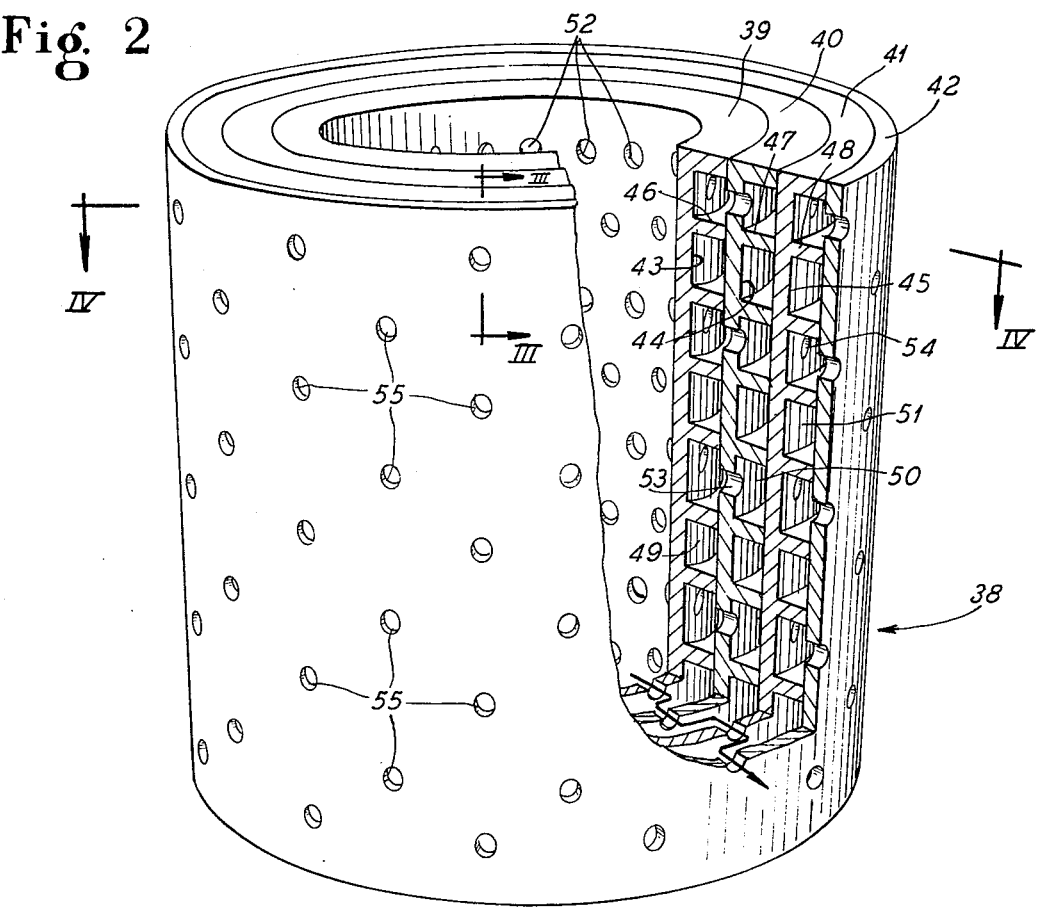
FIG. 2 is an isometric view of the nested or telescoped sleeves or tubes forming the cage of the valve of this invention with portions broken away to illustrate flow paths through the sleeves.
Figure 3:
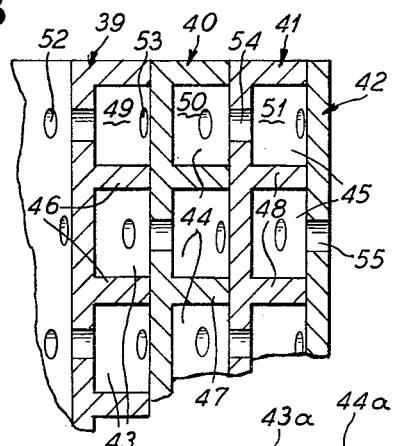
FIG. 3 is a longitudinal sectional view along the line III—III of FIG. 2.

As shown in FIG. 2, the cage 38 is composed of concentric tubular sleeves including an innermost sleeve 39 surrounding by a second sleeve 40 which in turn is surrounding by a third sleeve 41 that is covered by an outer sleeve 42.

The sleeves 39, 40, and 41 have circumferential grooves 43, 44, and 45, respectively, around their outer peripheries and spaced closely adjacent each other along the length of the sleeves. The grooves in each sleeve are axially separated by annular ribs 46, 47, and 48, respectively, with each rib 46 of the inner sleeve 39 sealingly bottomed against the next adjacent sleeve 40, with the ribs 47 of the sleeve 40 being sealingly bottomed against the next adjacent sleeve 41 and with the ribs 48 of the sleeve 41 being sealingly bottomed against the emcompassing sleeve 42. The grooves 43, 44, and 45 thus form with the adjacent surrounding sleeves a plurality of axially separated tiers of annular chambers 49 around the inner sleeve 39, 50 around the middle grooved sleeve 40 and 51 around the outer groove sleeve 41.

Figure 4:
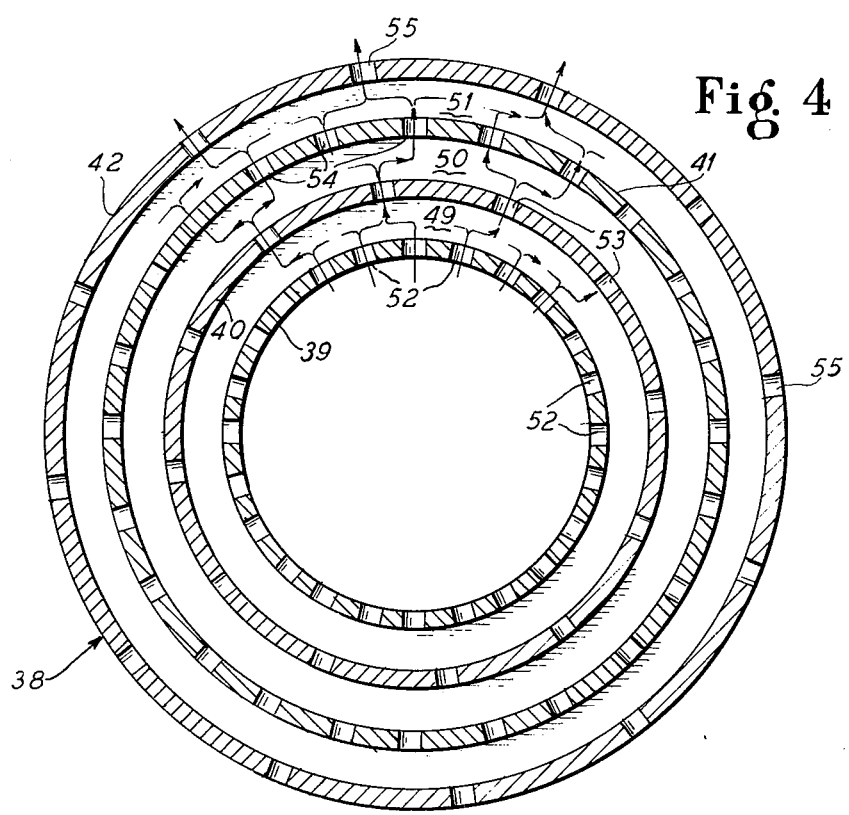
FIG. 4 is a transverse sectional view along the line IV—IV of FIG. 2.

The sleeves have radial orifices therethrough communicating with the annular chambers in each tier but offset circumferentially from each other so that radial flow through the cage can only occur in an elongated tortuous path. Thus, as shown in FIGS. 2 and 4, the inner sleeve 39 has axially spaced rings of circumferentially spaced orifices 52 with each ring of orifices being aligned with the axial center of the surrounding annular chamber. The sleeve 40 surrounding the sleeve 39 has similar orifices 53 arranged in axially spaced rings to discharge into each surrounding annular chamber 50. However, as shown in FIG. 4, the orifices 53 are circumferentially offset from the orifices 52, being spaced apart circumferentially a greater distance than the orifice 52. The sleeve 41 has similar axially spaced rings of circumferentially spaced orfices 54 registering with the annular chamber 51 but these orifices 54 are circumferentially offset from the orifices 53 as shown in FIG. 4. As there shown, the orifices 54 are closer together than the orifices 53. Finally, in the outermost sleeve 42, axially spaced rings of circumferentially spaced orifices 55 register with the outer annular chambers 51 and these orifices 55 are circumferentially offset from the orifices 54 being spaced apart at greater distances than the orifices 54 as shown in FIG. 4.

It will therefore be understood that fluid passing in either direction through the cage 38 is divided into a myriad of streams by the orifices and can only pass through the cage in a tortuous path through the annular chambers in the cage. Thus, if the flow through the cage is outwardly from the inner to the outer sleeve, the fluid will be divided into small streams by the orifices 52 and will be received in the inner annular chambers 49 where it will be circumferentially deflected before it can reach an orifice 53. As illustrated in FIG. 4, the fluid will divide circumferentially from adjacent orifices 52 to the closest adjacent orifices 53 to enter the surrounding annular chamber 50 whereupon it will again have to make an abrupt turn before it can reach the closest adjacent orifices 54. Since these orifices are closer together than the orifices 53, the fluid will divide again from the orifices 53 through the annular chamber 50 to the orifice 54. Next, the fluid entering the annular chamber 51 from the orifices 54 must again make an abrupt turn and as illustrated, will divide from the orifices 54 to the closest adjacent orifices 55 which are spaced farther apart circumferentially than the orifices 54. The fluid discharging from the orifices 55 will enter the discharge side of the valve casing 27.

The arrows in FIGS. 2 and 4 show the general tortuous paths for radial flow of fluid in each tier of annular chambers in the nested sleeves but it will, of course, be understood that streams can divide to flow in opposite directions in a circumferential passage and that oppositely flowing streams from adjacent orifices can impact against each other to combine or reverse flow. This impacting and reversals aid the frictional resistance to flow. Thus, the fluid itself provides frictional resistance to flow and dissipates energy.

Figure 5:
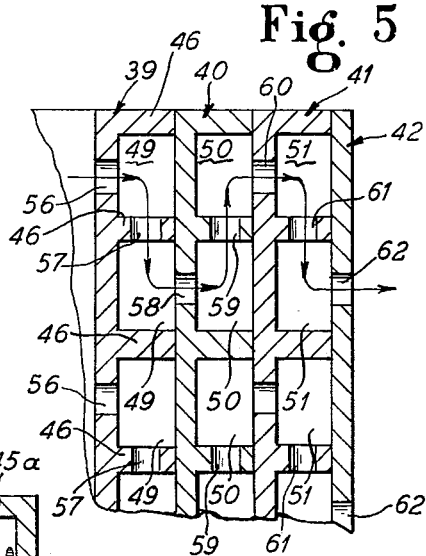
FIG. 5 is a fragmentary longitudinal sectional view showing a modified flow path through the nested sleeves.

Numerous flow patterns may be provided by the nested or telescoped sleeve valve assembly of this invention by varying the orifice positions. For example, as shown in FIG. 5, instead of providing all of the orifices at the axial midpoints of the annular chambers, such orifices could alternate with axial orifices through the respective ribs of the grooved sleeves. In FIG. 5, the orifices are arranged so that the tortuous flow paths would include axial as well as radial legs. As there shown, the inner sleeve 39 has rings of orifices 56 that are separated so that they will only communicate with alternate chambers 49 in the inner tier of chambers. Alternate ribs 46 of the inner sleeve have axial orifices 57 joining the annular chamber 49 in one tier with the chamber 49 in the next adjacent tier. Then, the middle grooved sleeve 40 has radial orifices 58 receiving fluid from the adjacent inner chamber 49 while axial orifices 59 in one rib of the chamber 50 discharge the fluid into the chamber 50 of the next adjacent tier. Radial orifices 60 feed the fluid to the outer chamber 51 while axial orifices 61 in a rib of this chamber feed the fluid to the next adjacent chamber in the tier and then orifices 62 discharge the fluid through the outer sleeve 42. In this arrangement, of course, each ring of orifices 56 feeds two adjacent tiers of annular chambers.

Figure 6:
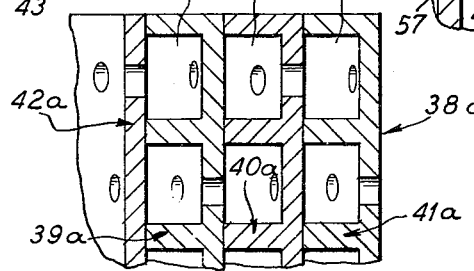
FIG. 6 is a view similar to FIG. 3 but showing the nested sleeves with annular passages in their inner peripheries instead of their outer peripheries as in FIG. 3.

It will be further understood that baffles could be placed in the annular chambers 49, 50, and 51, that the shapes of the chambers can be varied as desired, and that the grooves could be provided in the inner peripheries of the grooved concentric tubular sleeves as shown in FIG. 6 where the ungrooved sleeve 42 of the cage 38 becomes the inner sleeve 42a of the cage 38a and the surrounding grooved sleeves 39a, 40a, and 41a have internal grooves 43a, 44a, and 45a instead of external grooves.

In the more or less schematic showing of FIG. 1, the cage 38 surrounds the plug 28 in an annular chamber 17 of a one piece housing structure and is fitted into the housing walls at the top and bottom ends of the cage. It will, of course, be understood that the housing can be made in a plurality of sections to accommodate insertion and clamping of the cage in position and that the plug 28 could have many different structural features and shapes to fit a surrounding cage. The central aperture or bore of the cage snugly receives the plug 28 and piston rings or other seals can be used to insure sealing off of any rings of orifices 52 covered by the plug. As the plug is retracted to uncover successive rings of orifices 52, the throttling effect of the valve assembly, of course, is decreased. It will also, of course, be understood that the device of this invention can be used without a plug since in some installations flow need not be throttled or may be throttled or stopped by a separate valve.

The sleeves of the cage of this invention are rigid, preferably composed of metal such as stainless steel, bronze, or the like, and can be welded or brazed together in integral, leakproof relation.

From the above description it should be understood that this invention now provides sleeve cages for high energy loss fluid control devices of the type disclosed in my aforesaid U.S. Pat. Nos. 3,451,404; 3,513,864; and 3,514,074.

I claim as my invention:

1. In an energy loss fluid control device having a casing defining a fluid flow passage and a cage in the casing receiving the fluid therethrough, the improvement which comprises said cage being composed of a plurality of nested concentric tubular sleeves defining tiers of annular chambers in nested radial relation, and orifices in each sleeve registering with adjacent chambers of said annular chambers in circumferentially offset relation with the orifices of the next adjacent sleeve to provide tortuous elongated flow paths for fluid flowing through the cage.

2. A cage for an energy loss fluid control device which comprises a plurality of nested concentric peripherally grooved rigid inner, intermediate and outer tubular sleeves defining nested tiers of axially and radially separated annular chambers, each of said sleeves having an inner periphery and an outer periphery axially spaced rings of circumferentially spaced radial orifices in the inner periphery of the inner sleeve and the outer periphery of the outer sleeve, and additional rings of circumferentially spaced orifices in each intermediate sleeve connecting the annular chambers and arranged in circumferentially offset relationship in each chamber to cooperate with the rings of orifices in the inner periphery of the inner sleeve and the outer periphery of the outer sleeve to define tortuous flow paths extending radially through the cage for imparting frictional resistance to the flow of fluid and thereby dissipate energy in the fluid.

3. The device of claim 1 wherein the nested sleeves have annular grooves cooperating with adjacent sleeves to define the annular chambers.

4. The device of claim 1 having at least three nested sleeves.

5. The device of claim 1 having a plurality of peripherally grooved nested concentric tubular sleeves surrounded by an outer tubular sleeve having axially spaced rings of circumferentially spaced orifices communicating with each tier of annular chambers in the outermost grooved sleeve.

6. The device of claim 1 wherein the nested sleeves have annular grooves around the inner peripheries thereof and include an innermost grooved sleeve and an orificed sleeve covers the inner periphery of the innermost grooved sleeve.

7. The device of claim 1 wherein the cage has radial and axial orifices registering with the chambers.

8. The cage of claim 2 wherein grooves of the grooved sleeves are in the outer peripheries of the sleeves.

9. The cage of claim 2 wherein grooves of the grooved sleeves are in the inner peripheries of the sleeves.

10. The cage of claim 2 including an ungrooved sleeve surrounding grooves of an adjacent grooved sleeve.

11. The cage of claim 10 wherein the ungrooved sleeve is around the outer periphery of the outer tubular sleeve of the cage.

12. The cage of claim 10 wherein the ungrooved sleeve covers the inner periphery of the inner sleeve of the cage.

13. The cage of claim 2 wherein the sleeves are bonded together into integral relation.

14. The device of claim 1 wherein the annular chambers have larger volumes than the orifices feeding the chambers.

15. In an energy loss fluid control device having a casing defining a fluid flow passage and a cage in the casing receiving the fluid therethrough, the improvement which comprises said cage being composed of a plurality of nested concentric tubular sleeves forming annular chambers therebetween, and orifices in the sleeves registering with the adjacent chambers, with the orifices in each sleeve being in circumferentially offset relation with the orifices in the next adjacent sleeve to provide tortuous elongated flow paths for fluid flowing through the cage.

16. In a high energy loss fluid control device adapted for installation in a fluid transfer system where potentially destructive or noise generating fluid pressure differential exists, a casing having a flow passage therethrough, a cage in said flow passage receiving fluid radially therethrough, said cage having a central bore surrounded by an inner peripheral face, a device plug slidable in said bore, axially spaced rings of circumferentially spaced orifices in said inner and outer peripheral faces of the said cage, said orifices in said inner peripheral face of the cage registering with said bore and adapted to be covered and uncovered by said plug, said cage having a plurality of axially separated tiers of chambers between the inner and outer peripheral faces of the cage, the chambers in each tier registering only with orifices in one ring of orifices in the inner peripheral face of the cage and with one ring of orifices in the outer peripheral face of the cage, and said registering orifices and chambers in each tier defining flow paths which create high frictional resistances losses and pressure drop on fluid flowing through the cage and which flow paths are axially separated and adapted to be blocked by said plug without receiving fluid from another tier of flow paths.

17. The device of claim 16 wherein the cage is composed of concentric telescoped tubular sleeves with peripheral grooves covered by adjacent sleeves to define said tiers of chambers.

18. The device of claim 16 wherein the cage is composed of nested concentric tubular sleeves defining the chambers and orifices are provided in each sleeve communicating with the chambers in circumferentially offset relation so that fluid flowing through the cage must flow axially and circumferentially.

19. The device of claim 16 wherein the cage is composed of a plurality of nested concentric tubular sleeves defining the axially separated tiers of chambers and the orifices in the inner and outer peripheral faces of the cage are arranged so that fluid flowing through the cage must follow tortuous flow paths.

* * * * *